(12) United States Patent
Kato

(10) Patent No.: US 9,029,699 B2
(45) Date of Patent: May 12, 2015

(54) LIQUID-PROOF STRUCTURE FOR WIRE HARNESS

(75) Inventor: Hajime Kato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/574,066

(22) PCT Filed: Dec. 15, 2011

(86) PCT No.: PCT/JP2011/079061
§ 371 (c)(1),
(2), (4) Date: Jul. 19, 2012

(87) PCT Pub. No.: WO2012/081671
PCT Pub. Date: Jun. 21, 2012

(65) Prior Publication Data
US 2012/0292101 A1   Nov. 22, 2012

(30) Foreign Application Priority Data

Dec. 16, 2010 (JP) .................................. 2010-280613

(51) Int. Cl.
*H02G 3/04* (2006.01)
*B60R 16/02* (2006.01)
(Continued)

(52) U.S. Cl.
CPC ........ *B60R 16/0222* (2013.01); *H01R 13/5208* (2013.01); *H02G 3/22* (2013.01) 248/68.1

(58) Field of Classification Search
USPC ............ 174/480, 481, 135, 72 A, 84 C, 72 C, 174/77 R, 152 G, 153 G, 152 R; 248/49, 62, 248/68.1, 74.3; 277/312, 314, 602
See application file for complete search history.

(56) References Cited

U.S. PATENT DOCUMENTS

| 4,815,984 A | * | 3/1989 | Sugiyama et al. | ........... 174/72 A |
| 5,170,017 A | | 12/1992 | Stanevich et al. | |
| 5,442,140 A | * | 8/1995 | McGrane | ...................... 174/151 |

(Continued)

FOREIGN PATENT DOCUMENTS

| JP | 5252641 A | 9/1993 |
| JP | 2002-238142 A | 8/2002 |

(Continued)

OTHER PUBLICATIONS

International Search Report dated Jan. 17, 2012 from the International Searching Authority in counterpart application No. PCT/JP2011/079061.

(Continued)

*Primary Examiner* — Angel R Estrada
(74) *Attorney, Agent, or Firm* — Sughrue Mion, PLLC

(57) ABSTRACT

An outer periphery of a single core conductor having a round rod shape and configuring an electric wire is coated with an insulation film such as enamel, except for a partial conductor exposed part at an end portion of the single core conductor, an end portion of the single core conductor is inserted into a through-hole of a seal member made of an elastic material that is mounted to a waterproof casing with being closely contacted thereto, an inner periphery of the through-hole of the seal member is in close contact with an outer periphery of the coated insulation film, and a connection terminal is provided to the partial conductor exposed part at the end portion of the single core conductor.

9 Claims, 4 Drawing Sheets

(51) Int. Cl.
  *H01R 13/52* (2006.01)
  *H02G 3/22* (2006.01)

(56) References Cited

U.S. PATENT DOCUMENTS

| | | |
|---|---|---|
| 2002/0048994 A1 | 4/2002 | Oota et al. |
| 2010/0300748 A1 | 12/2010 | Matsuoka et al. |

FOREIGN PATENT DOCUMENTS

| | | |
|---|---|---|
| JP | 2003115357 A | 4/2003 |
| JP | 2005251673 A | 9/2005 |
| JP | 200926475 A | 2/2009 |
| WO | 2009011182 A1 | 1/2009 |

OTHER PUBLICATIONS

Written Opinion dated Jan. 17, 2012 from the International Searching Authority in counterpart application No. PCT/JP2011/079061.
Supplementary European Search Report issued Jul. 2, 2014 in European Patent Application No. 11848133.2.
Office Action and Search Report dated Aug. 29, 2014, issued by the Chinese Patent Office in counterpart Chinese Application No. 201180009791.9.

* cited by examiner

LIQUID-PROOF STRUCTURE FOR WIRE HARNESS

TECHNICAL FIELD

The present invention relates to a liquid-proof (particularly, waterproof and oil-proof) structure for a wire harness that prevents moisture or oil component from being infiltrated from a conductor exposed part of a terminal part of an electric wire configuring the wire harness into the electric wire through a gap between a conductor of the electric wire and an insulation layer covering an outer periphery of the conductor.

BACKGROUND ART

In a general wire harness for a vehicle, a so-called twisted electric wire where a resin serving as an insulation cover is extruded onto an outer periphery of a conductor consisting of a twisted wire has been used. When arranging the wire harness in a vehicle, it is necessary to adopt a liquid-proof measure to prevent water or oil from being infiltrated into the electric wire through a gap between the conductor of the electric wire configuring the wire harness and the insulation cover, depending on positions at which the wire harness is arranged. When the water or oil is infiltrated into the electric wire, the insulation cover may be deteriorated or the other adverse influence may be caused.

As an example of the conventional liquid-proof measure, a waterproof structure as shown in FIG. 4 is known. In FIG. 4, a reference numeral 20 indicates a covered electric wire, and an insulation cover 22 is provided on an outer periphery of a conductor 21 consisting of a twisted wire by extrusion molding. A connection terminal 40 is adhered to a terminal of the covered electric wire 20. The connection terminal 40 is connected to an exposed part of the conductor 21 at the terminal of the covered electric wire 20 by a conductor crimping part 41 that is provided at a rear end of the connection terminal 40, and a rear half part other than a front end 42 is accommodated in an internal space 38 of an inner housing 31 made of insulating resin, including the conductor crimping part 41 connected to the terminal of the covered electric wire 20. The front end 42 of the connection terminal 40 protrudes to the outside more than a front end of the inner housing 31. The other terminal and the like are connected to the front end 42. Also, the connection terminal 40 is engaged at a fixed position by an engaging member 35 that is provided to the inner housing 31. In the meantime, an outer side of the inner housing 31 is covered with an outer shell 32.

Also, the inner housing 31 is provided at its front part and rear part with a first seal member 28 and a second seal member 25, respectively. The first seal member 28 provided at the front part is arranged in a terminal insertion-through hole 36 of the inner housing 31 and is in close contact with an inner wall of the terminal insertion-through hole 36 and a longitudinally central part 43 of the connection terminal 40, thereby sealing a gap between the connection terminal 40 and the inner housing 31. Also, the second seal member 25 provided at the rear part is accommodated in a rear part opening 37 of the inner housing 31 and an outer lip 26 is in close contact with an inner wall of the rear part opening 37 of the inner housing 31 and an inner lip 27 is closely contacted to an outer periphery of the insulation cover 22 of the covered electric wire 20, thereby sealing between the insulation cover 22 of the covered electric wire 20 and the inner housing 31. In the meantime, the outer lip 26 and the inner lip 27 of the second seal member 25 are provided with adhesive force as a seal pressing member 33 is pressed.

In this way, the internal space 38 of the inner housing 31 is sealed by the first seal member 28 and the second seal member 25. Thereby, it is possible to block the liquid that is about to be infiltrated from the front end of the inner housing 31, as shown with an arrow A1, and to block the liquid that is about to be infiltrated from the rear end of the inner housing 31, as shown with an arrow A2. Accordingly, it is possible to prevent the liquid from being infiltrated into the gap between the conductor 21 and the insulation cover 22 from the exposed part of the conductor 21 at the terminal of the covered electric wire 20, as shown with an arrow A3.

In the meantime, the above waterproof structure is well known in Patent Literature 1 and the like.

CITATION LIST

Patent Literature

Patent Literature 1: JP-A-2003-115357

SUMMARY OF INVENTION

Technical Problem

In the meantime, according to the waterproof structure shown in FIG. 4, it is necessary to arrange the first seal 28 between the connection terminal 40 and the inner housing 31 and arrange the second seal 25 between the insulation cover 22 of the covered electric wire 20 and the inner housing 31. Hence, the structure becomes complicated and the number of components is increased, so that the cost is increased. Also, a size of the terminal part of the electric wire is increased.

The present invention has been made to solve the above problems. An object of the invention is to provide a liquid-proof structure for a wire harness having a simple configuration and capable of suppressing the cost thereof and reducing a size of a liquid-proof connector part.

Solution to Problem

The above object of the invention is realized by following configurations.

(1) A liquid-proof structure for a wire harness, wherein an outer periphery of a single core conductor having a round rod shape and configuring an electric wire is coated with an insulation film such as enamel, except for a partial conductor exposed part at an end portion of the single core conductor, an end portion of the single core conductor is inserted into a through-hole of a seal member made of an elastic material that is mounted to a waterproof casing with being closely contacted thereto, an inner periphery of the through-hole of the seal member is in close contact with an outer periphery of the coated insulation film, and a connection terminal is provided to the partial conductor exposed part at the end portion of the single core conductor.

(2) The liquid-proof structure for the wire harness according to the above (1), wherein a plurality of single core conductors are provided, the outer periphery of each of the single core conductors is coated with the insulation film such as enamel, except for the partial conductor exposed parts at both end portions of each of the single core conductors, both end portions of each of the single core conductors are inserted into the respective through-holes of the seal member having a disc shape that is mounted to the waterproof casing with being closely contacted thereto, the inner periphery of each through-hole of the seal member is in close contact with the outer periphery of the coated insulation film, and the connection terminal is provided to the partial conductor exposed parts at both end portions of each of the single core conductors.

According to the liquid-proof structure for the wire harness having the above (1) configuration, the conductor of the electric wire configuring the wire harness is made of a single core conductor having a round bar shape, and an insulation film such as enamel is coated on the outer periphery of the single core conductor, as an insulation layer thereof. Hence, it is possible to completely remove a gap between the insulation layer and the conductor, which is present in the twisted electric wire of the conventional wire harness and into which the liquid may be infiltrated. Therefore, it is possible to improve the reliability of waterproof and oil-proof. Also, the inner periphery of the through-hole of the seal member is in close contact with the outer periphery of the insulation film such as enamel. Thus, it is possible to securely seal a gap between the waterproof casing and the electric wire by mounting the seal member to the waterproof casing with being closely contacted thereto. Therefore, the configuration is simplified and the number of components is reduced, so that it is possible to reduce the cost. Also, as the configuration is simplified and the number of components is reduced, it is possible to reduce a size of a waterproof connector part (a part that is connected to the other circuit) at the terminal of the electric wire.

According to the liquid-proof structure for the wire harness having the above (2) configuration, both end portions of the electric wires are enabled to pass through the respective through-holes of the integral seal member arranged at both ends of each electric wire and are thus sealed. Thereby, the configuration can be effectively used when connecting a plurality of internal circuits to each other in waterproof spaces that are isolated from each other.

MODES FOR CARRYING OUT INVENTION

Hereinafter, a first embodiment of the invention will be described with reference to the drawings.

Figure 1:
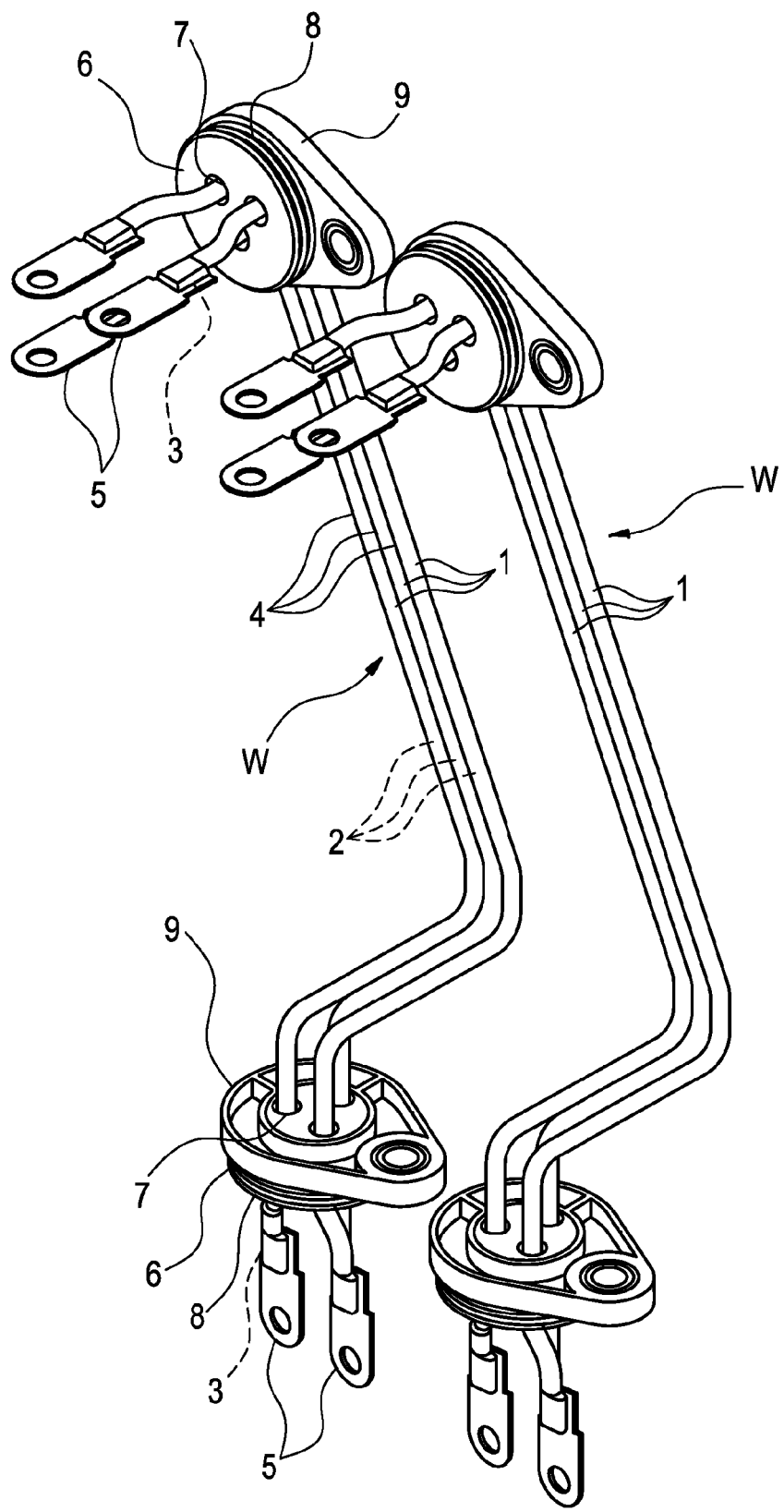
FIG. 1 is a perspective view showing a liquid-proof structure for a wire harness according to a first embodiment of the invention.
Figure 2:
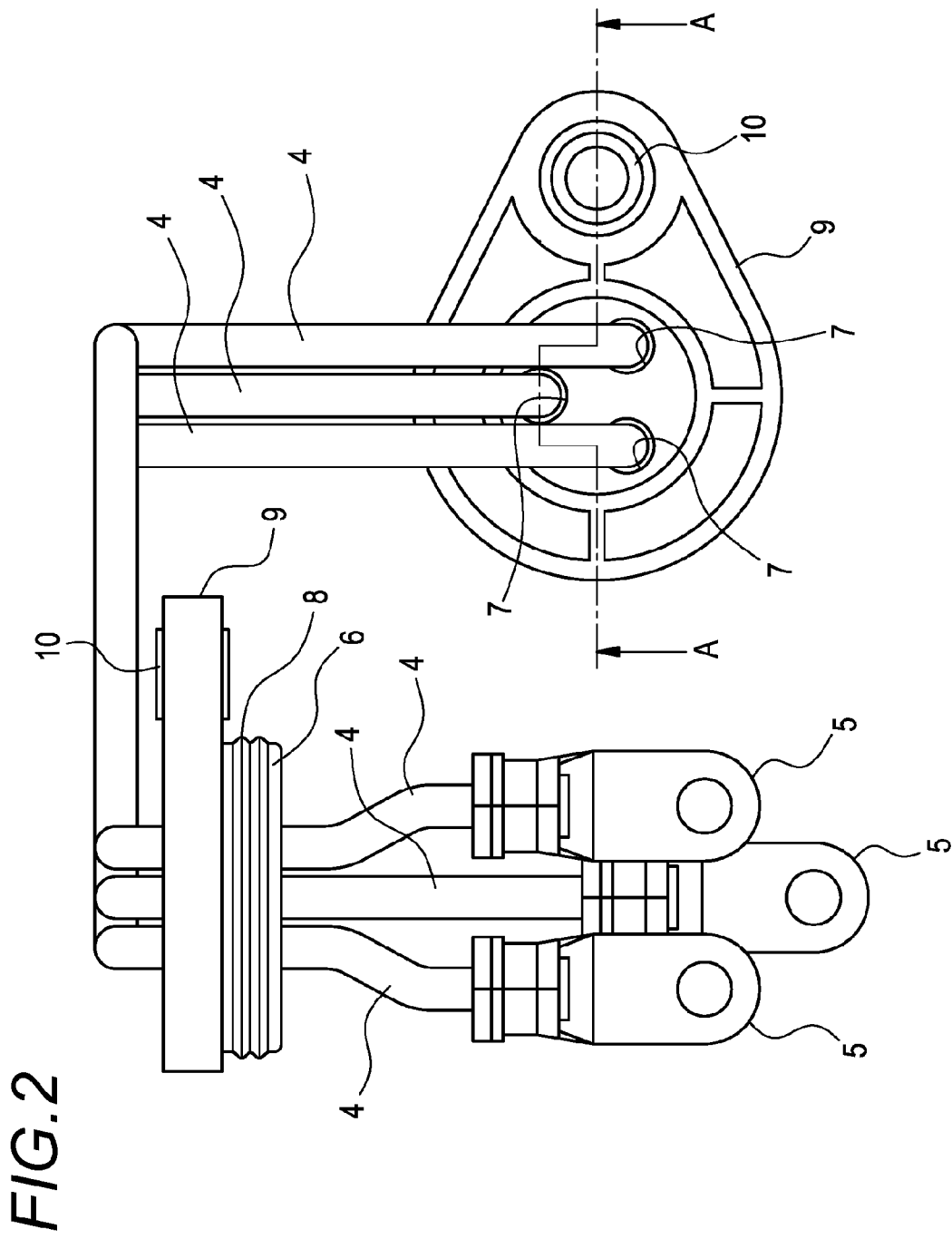
FIG. 2 is a plan view of the liquid-proof structure for the wire harness shown in FIG. 1.

As shown in FIGS. 1 and 2, a liquid-proof structure for a wire harness W according to this embodiment has a bundle of a plurality of electric wires 1 that are arranged in parallel with each other along the substantially same path, seal members 6, each having a disc shape, that are arranged at both ends of the bundle of the electric wires 1 and are made of an elastic material such as rubber, attaching brackets 9 that hold the seal members 6 and are made of resin, connection terminals 5, each having a flat plate shape, that are adhered to terminals of the respective electric wires 1 and collars 10 that are mounted to the attaching brackets 9 and are made of metal.

Each electric wire 1 that is here used has a configuration that an outer periphery of a single core conductor 2 having a round rod shape (which is not seen in FIG. 1 because it is hidden by an insulation film 4 that will be described later) is coated with the insulation film 4 such as enamel, except for a partial conductor exposed part 3 (which is a part to which a base end of the connection terminal 5 is adhered by welding and the like and is concealed and thus is not seen, in FIG. 1) at an end portion of the single core conductor 2. The insulation film 4 such as enamel may be coated by dipping the single core conductor 2 into a bath of liquid such as enamel, or by painting liquid such as enamel onto an outer periphery of the single core conductor 2.

Figure 3:
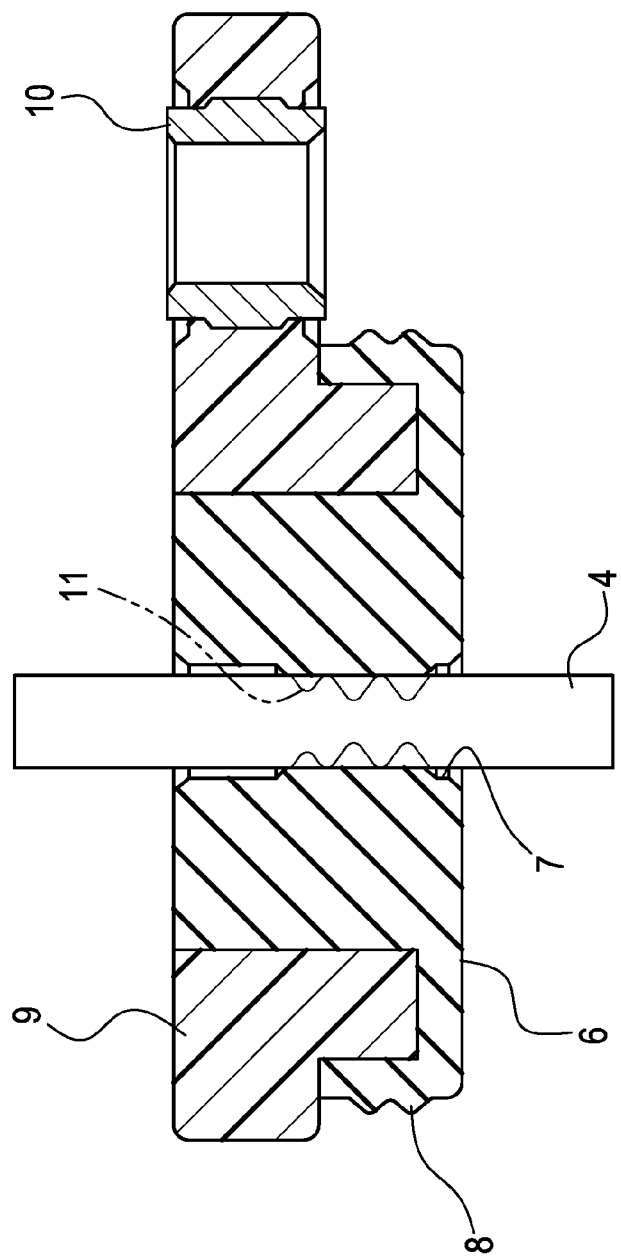
FIG. 3 is a sectional view taken along a line A-A of FIG. 2.
Figure 4:
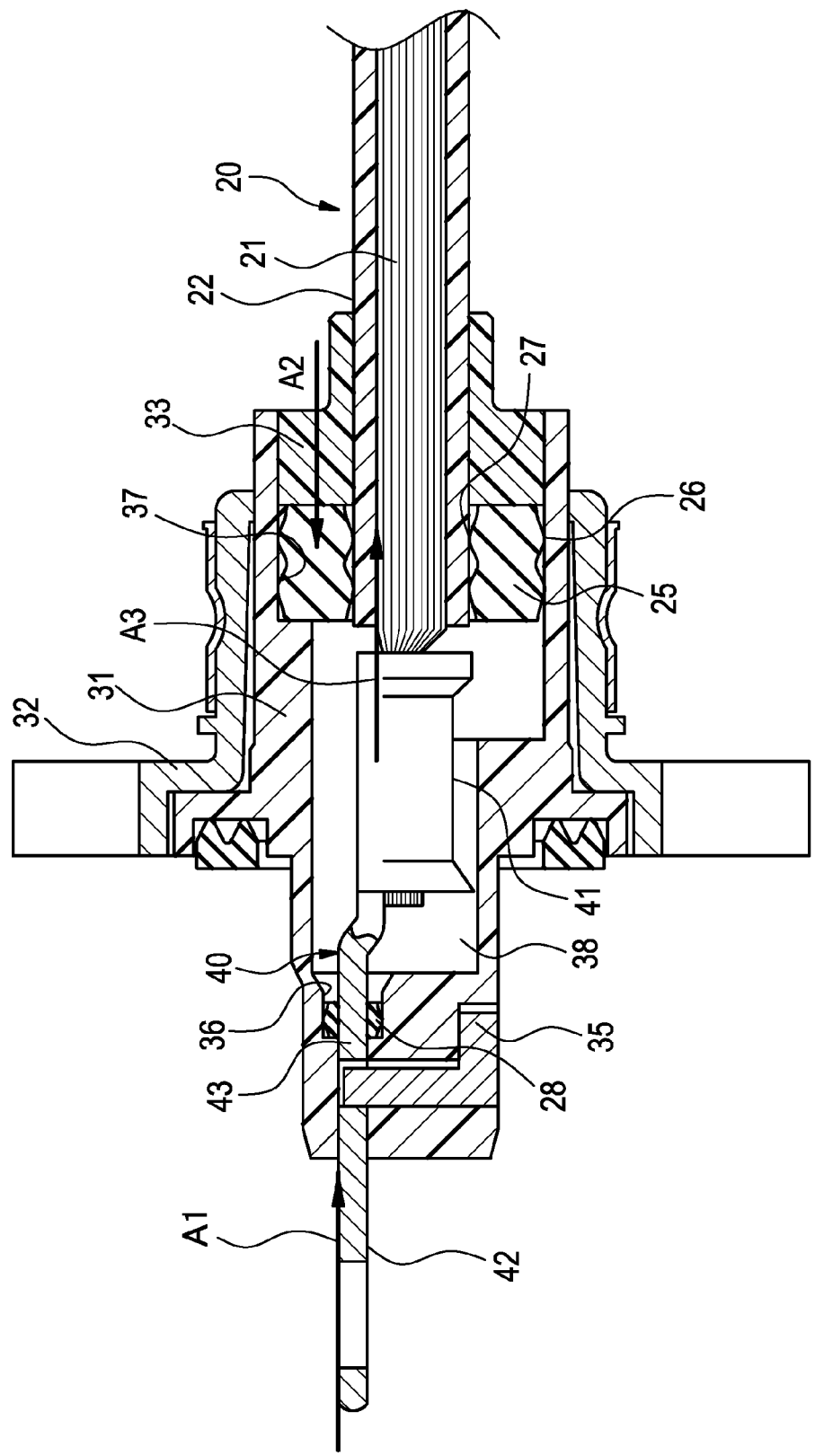
FIG. 4 is a sectional view showing a liquid-proof structure for a wire harness according to the related art.

As shown in FIG. 3, the seal member 6 having a disc shape has through-holes 7 corresponding to the number of the electric wires 1 that are enabled to pass therethrough in a direction perpendicular to a disc surface and are thus arranged therein. The seal member 6 has an outer lip 8 at an outer periphery thereof, which is closely contacted to an inner periphery of a circular opening of a waterproof casing (not shown) when the seal member is fitted in the circular opening and an inner lip 11 at an inner periphery thereof, which is in close contact with an outer periphery of the electric wire 1 when the electric wire 1 is inserted. The seal member 6 is integrally formed with the attaching bracket 9 by insert molding. When the attaching bracket 9 is attached to the waterproof casing, the seal member 6 is mounted to the waterproof casing with being closely contacted thereto. In the meantime, the seal member 6 and the attaching bracket 9 may not be integrally formed and a seal member and an attaching bracket that are separately formed may be combined.

An end portion of the electric wire 1 is inserted into each through-hole 7 of the seal member 6 that is mounted to the waterproof casing with being closely contacted thereto. Thereby, the inner lip 11 that is provided on the inner periphery of the through-hole 7 of the seal member 6 is closely contacted to an outer periphery of the coated insulation film 4. The connection terminal 5 is adhered to the partial conductor exposed part 3 of the electric wire 1 introduced into the waterproof casing.

According to the liquid-proof structure configured as described above, the conductor of the electric wire 1 configuring the wire harness W is made of the single core conductor 2 having a round bar shape, and the insulation film 4 such as enamel is coated on the outer periphery of the single core conductor 2, as an insulation layer thereof. Hence, it is possible to completely remove a gap between the insulation layer and the conductor, which is present in the twisted electric wire of the conventional wire harness and into which the liquid may be infiltrated. Therefore, it is possible to improve the reliability of waterproof and oil-proof.

Also, the inner periphery of the through-hole 7 of the seal member 6 is in close contact with the outer periphery of the insulation film 4 such as enamel. Thus, it is possible to securely seal a gap between the waterproof casing and the electric wire 1 by mounting the seal member 6 to the waterproof casing with being closely contacted thereto. Therefore, the configuration is simplified and the number of components is reduced, so that it is possible to reduce the cost. Also, as the configuration is simplified and the number of components is reduced, it is possible to reduce a size of a waterproof connector part (a part that is connected to the other circuit) at the terminal of the electric wire 1.

Also, according to the liquid-proof structure of this embodiment, both end portions of the electric wires 1 are enabled to pass through the respective through-holes 7 of the integral seal members 6 arranged at both ends of each electric wire 1 and are thus sealed. Thereby, the configuration can be effectively used when connecting a plurality of internal circuits to each other in waterproof spaces that are isolated from each other.

Also, when the insulation film 4 such as enamel is coated on the outer periphery of the single core conductor 2 and the insulation layer is thus configured, like the liquid-proof structure of this embodiment, it is possible to suppress the non-uniformity in an outer diameter size of the insulation film. Therefore, regarding a case where an overmold layer is further formed on an outer side of the insulation layer, when closing a metallic mold for overmold, it is possible to stabilize the quality without biting the insulation layer of the electric wire that is set in the metallic mold.

Also, the insulation film such as enamel may be also coated after forming the single core conductor 2 into a predetermined arranging shape. Thus, it is possible to easily cope with any arranging shape. Also, when an electric wire having an insulation cover, like the conventional covered electric wire, is bent along an arranging path, the insulation layer may be damaged, so that the insulation capability may be deteriorated. However, when the insulation film 4 is coated after forming the single core conductor 2 into an arranging shape, it is possible to exclude the deterioration influence of the insulation layer.

Also, since the insulation film 4 such as enamel can be formed to be thinner, compared to the resin insulation cover made by the extrusion molding, it is possible to reduce a weight of the wire harness W. Also, since it is possible to closely arrange the electric wires 1, it is possible to make the wire harness W or connector part smaller.

In the meantime, even when a sectional shape of the single core conductor 2 is rectangular such as flat plate-shaped conductor, it is possible to prevent the gap between the insulation layer and the conductor when coating the insulation film 4 on the outer periphery of the single core conductor. However, it is difficult to maintain the seal capability when the single core conductor is enabled to pass through a seal member (O-ring or seal member 6 as described above). Therefore, according to the liquid-proof structure, the single core conductor 2 having a round bar is adopted.

In the meantime, the invention is not limited to the above embodiment and can be appropriately changed and modified. Also, the material quality, the shape, the size, the number, the arranging part and the like of each constitutional element in the above embodiment are arbitrary and are not limited thereto insomuch as the invention can be implemented.

For example, the connection terminal 5 may be obtained by forming a leading end of the single core conductor 2 into a terminal shape by a press and the like.

This application is based on Japanese Patent Application (Patent Application No. 2010-280613) filed on Dec. 16, 2010, the disclosures of which are incorporated herein by reference.

Industrial Applicability

According to the liquid-proof structure for the wire harness of the invention, it is possible to improve the reliability of waterproof and oil-proof. Also, as the configuration is simplified and the number of components is reduced, it is possible to reduce the cost and the size of the waterproof connector part at the terminal of the electric wire.

REFERENCE SINGS LIST

W: wire harness
1: electric wire
2: single core conductor
4: insulation film
5: connection terminal
6: seal member
7: through-hole
8: outer lip
9: attaching bracket
10: collar
11: inner lip

The invention claimed is:

1. A liquid-proof structure for a wire harness, wherein
a plurality of single core conductors are provided,
an outer periphery of each of the single core conductors is coated with an insulation film, except for partial conductor exposed parts at both end portions of each of the single core conductors,
both end portions of each of the single core conductors are inserted into the respective through-holes of seal members, each having a disc shape that is mounted to a waterproof casing with being closely contacted thereto,
an inner periphery of each through-hole of the seal members is in close contact with the outer periphery of the coated insulation film, and
connection terminals are respectively provided to the partial conductor exposed parts at both end portions of each of the single core conductors.

2. The liquid-proof structure for the wire harness according to claim 1, wherein the outer peripheries of each of the single core conductors are arranged in parallel with each other along the substantially same path and are arranged as a bundle.

3. The liquid-proof structure for the wire harness according to claim 1, wherein the seal member is adhered to an outer periphery of a single core conductor terminal.

4. The liquid-proof structure for the wire harness according to claim 1, wherein the connection terminal has a weld to the partial conductor exposed part at the end portion of the single core conductor.

5. The liquid-proof structure for the wire harness according to claim 1, wherein the insulation film is enamel.

6. The liquid-proof structure for the wire harness according to claim 1, wherein the seal member is integrally formed with an attaching bracket.

7. The liquid-proof structure for the wire harness according to claim 1, wherein the seal member is combined with an attaching bracket which is separately formed with the seal member.

8. The liquid-proof structure for the wire harness according to claim 1, wherein an inner lip that is provided on the inner periphery of the through-hole is closely contacted to the outer periphery of the coated insulation film.

9. The liquid-proof structure for the wire harness according to claim 1, wherein the partial conductor exposed part of each single core conductor is fully covered with the connection terminal.

* * * * *